(12) United States Patent
Farrell et al.

(10) Patent No.: US 10,554,641 B2
(45) Date of Patent: **\*Feb. 4, 2020**

(54) SECOND FACTOR AUTHORIZATION VIA A HARDWARE TOKEN DEVICE

(71) Applicant: International Business Machines Corporation, Armonk, NY (US)

(72) Inventors: Leo M. M. Farrell, Main Beach (AU); Jared R. Page, Southport (AU); Shane B. Weeden, Gold Coast (AU)

(73) Assignee: International Business Machines Corporation, Armonk, NY (US)

( \* ) Notice: Subject to any disclaimer, the term of this patent is extended or adjusted under 35 U.S.C. 154(b) by 208 days.

This patent is subject to a terminal disclaimer.

(21) Appl. No.: 15/442,821

(22) Filed: Feb. 27, 2017

(65) Prior Publication Data

US 2018/0248861 A1 Aug. 30, 2018

(51) Int. Cl.
*G06F 21/00* (2013.01)
*H04L 29/06* (2006.01)

(52) U.S. Cl.
CPC ........ *H04L 63/062* (2013.01); *H04L 63/0838* (2013.01); *H04L 63/0853* (2013.01); *H04L 2463/082* (2013.01)

(58) Field of Classification Search
None
See application file for complete search history.

(56) References Cited

U.S. PATENT DOCUMENTS

| 7,823,192 B1* | 10/2010 | Fultz ................. G06F 21/33 709/225 |
| 8,352,739 B2 | 1/2013 | Park et al. |
| 8,397,076 B2* | 3/2013 | Brown ............... H04L 9/0822 380/30 |
| 8,880,895 B2* | 11/2014 | Shankaranarayanan .................. G06F 21/31 713/184 |
| 9,002,750 B1* | 4/2015 | Chu ................. H04L 63/0838 705/55 |
| 9,092,609 B2 | 7/2015 | Pieczul et al. |
| 9,185,108 B2 | 11/2015 | M'Raihi et al. |
| 9,317,674 B2* | 4/2016 | Grigg ................. G06F 21/31 |
| 9,350,739 B2 | 5/2016 | Hockings et al. |
| 9,374,356 B2 | 6/2016 | Sondhi et al. |
| 9,407,628 B2 | 8/2016 | Sondhi et al. |

(Continued)

FOREIGN PATENT DOCUMENTS

| WO | 2014102294 A1 | 7/2014 |
| WO | 2017001972 A1 | 1/2017 |

OTHER PUBLICATIONS

Farrell et al., "Second Factor Authorization Via a Hardware Token Device", U.S. Appl. No. 15/854,838, filed Dec. 27, 2017, 36 pages.

(Continued)

*Primary Examiner* — Maung T Lwin
(74) *Attorney, Agent, or Firm* — Brian M. Restauro

(57) ABSTRACT

A credential associated with a username is received from a user. The credential is verified. A key identification and a first one-time password are received from a hardware token device. In response to validating the first one-time password, the username is linked to the key identification. A first access token and a first refresh token are generated. The first access token and the first refresh token are sent to the user.

14 Claims, 4 Drawing Sheets

(56) References Cited

U.S. PATENT DOCUMENTS

| | | | |
|---|---|---|---|
| 9,479,497 B2 | 10/2016 | von Krogh | |
| 9,565,195 B2 | 2/2017 | Grigg et al. | |
| 2008/0168543 A1* | 7/2008 | von Krogh | G06F 21/31 726/6 |
| 2008/0168544 A1* | 7/2008 | von Krogh | G06F 21/34 726/6 |
| 2008/0178252 A1* | 7/2008 | Michaud | H04L 63/083 726/1 |
| 2011/0197266 A1 | 8/2011 | Chu et al. | |
| 2013/0159195 A1 | 6/2013 | Kirillin et al. | |
| 2013/0212657 A1* | 8/2013 | Lu | G06F 21/44 726/6 |
| 2013/0347093 A1 | 12/2013 | von Krogh | |
| 2014/0090078 A1* | 3/2014 | Dellow | G06F 21/604 726/26 |
| 2014/0331060 A1 | 11/2014 | Hayton | |
| 2015/0172920 A1 | 6/2015 | Ben Ayed | |
| 2015/0178493 A1* | 6/2015 | Liu | G06F 21/45 726/6 |
| 2015/0350168 A1* | 12/2015 | Hayton | G06F 21/31 713/168 |
| 2016/0080383 A1 | 3/2016 | Hockings et al. | |
| 2016/0112412 A1 | 4/2016 | Roth et al. | |
| 2016/0219039 A1 | 7/2016 | Houthooft et al. | |
| 2017/0279795 A1 | 9/2017 | Redberg | |

OTHER PUBLICATIONS

IBM, List of Patent Applications Treated as Related, Appendix P, Dated Dec. 19, 2017, 2 pages.

Crocker et al., "Two factor encryption in cloud storage providers using Hardware Tokens", 978-1-4673-9526-7/15/ © 2015 IEEE, Printed Jan. 3, 2017, 6 pages.

Mahajan, Kanishk, "Oracle OAuth Service", Oracle White Paper | Mar. 2015, Copyright © 2015, Printed Jan. 3, 2017, 19 pages.

Mell et al., "The NIST Definition of Cloud Computing", Recommendations of the National Institute of Standards and Technology, NIST Special Publication 800-145, Sep. 2011, 7 pages.

Zhang et al., "TrustTokenF: a Generic Security Framework for Mobile Two-factor Authentication Using TrustZone", 978-1-4673-7952-6/15 © 2015 IEEE DOI 10.1109/Trustcom-BigDataSe-ISPA. 2015.355, IEEE Computer Society, Printed Jan. 3, 2017, pp. 41-48.

"OAuth-based security model", IBM Knowledge Center, Version 7.1.0, Printed Jan. 3, 2017, 3 pages, <https://www.ibm.com/support/knowledgecenter/SSHS8R_7.1.0/com.ibm.worklight.dev.doc/dev/c_oauth_security_model.html>.

Farrell et al., "Second Factor Authorization Via a Hardware Token Device", U.S. Appl. No. 16/361,269, filed Mar. 22, 2019, 25 pages.

Appendix P—List of IBM Patents or Patent Applications Treated as Related, Filed herewith, 2 Pages, Mar. 22, 2019.

* cited by examiner

SECOND FACTOR AUTHORIZATION VIA A HARDWARE TOKEN DEVICE

BACKGROUND

The present invention relates generally to the field of user authentication, and more particularly to providing second factor authorization using a hardware token device.

A common way to access a restricted website is for a user to sign into the website using credentials such as a username and a password. The username identifies the user while the password is a string of characters, known by the user, that is used for authentication. Since the password is known by the user, a password is considered part of the "knowledge" category of authentication (i.e., something the user knows). Additional categories include "possession" (something that a user has, such as a bank card) and "inherence" (something that a user is, such as a fingerprint of the user).

Two factor authorization (2FA) is a form of multi-factor authorization (MFA). MFA requires a user to submit multiple pieces of evidence to an authentication mechanism prior to being granted access to a computer, a website, etc. In 2FA, two different components are required to confirm the identity of a user before being granted access. A well-known 2FA example is withdrawing money from an automated teller machine (ATM). A user first inserts a bank card into the ATM (first factor—something the user has) and is then prompted to enter a personal identification number or PIN (second factor—something the user knows). Once the two factors are authenticated, the user is able to complete transactions via the ATM.

SUMMARY OF THE INVENTION

Embodiments of the present invention include an approach for providing second factor authorization using a hardware token device. In one embodiment, a credential associated with a username is received from a user. The credential is verified. A key identification and a first one-time password are received from a hardware token device. In response to validating the first one-time password, the username is linked to the key identification. A first access token and a first refresh token are generated. The first access token and the first refresh token are sent to the user.

DETAILED DESCRIPTION

Embodiments of the present invention allow for providing second factor authorization using a hardware token device. Today, tools for using an open standard for authorization (i.e., granting access) may use an access token and a refresh token as a means for accessing a website. The open standard tools may utilize a shared, secret second factor authorization, such as a personal identification number (PIN), as part of the initial registration. When the short lived access token expires, the refresh token and PIN are used to obtain a new access token. The PIN provides security protection from an attacker who has knowledge of the refresh token. Requiring manual re-entry of the PIN results in a poor user experience for the user. The PIN is also one of the lowest forms of security as it is likely short (i.e., not complex), the PIN must be remembered by the user, and the PIN may not expire.

Embodiments of the present invention recognize that there may be a method, computer program product, and computer system for providing second factor authorization using a hardware token device. In an embodiment, the hardware token device may easily communicate with other hardware during the authentication process. The hardware token device includes a key identification (KeyID) used to identify a specific hardware token device. The hardware token device generates a one-time password (OTP) which is more secure than a PIN as it is more complex and only used once. Another benefit of the hardware token device is that if an attacker is able to acquire the refresh token in an attempt to gain access to a website, the attacker cannot access the website without possession of the device used to generate the hardware token. The method, computer program product and computer system may use a hardware token device which generates a OTP that is used in conjunction with a refresh token in order to maintain access to a website.

The present invention will now be described in detail with reference to the Figures.

Figure 1:
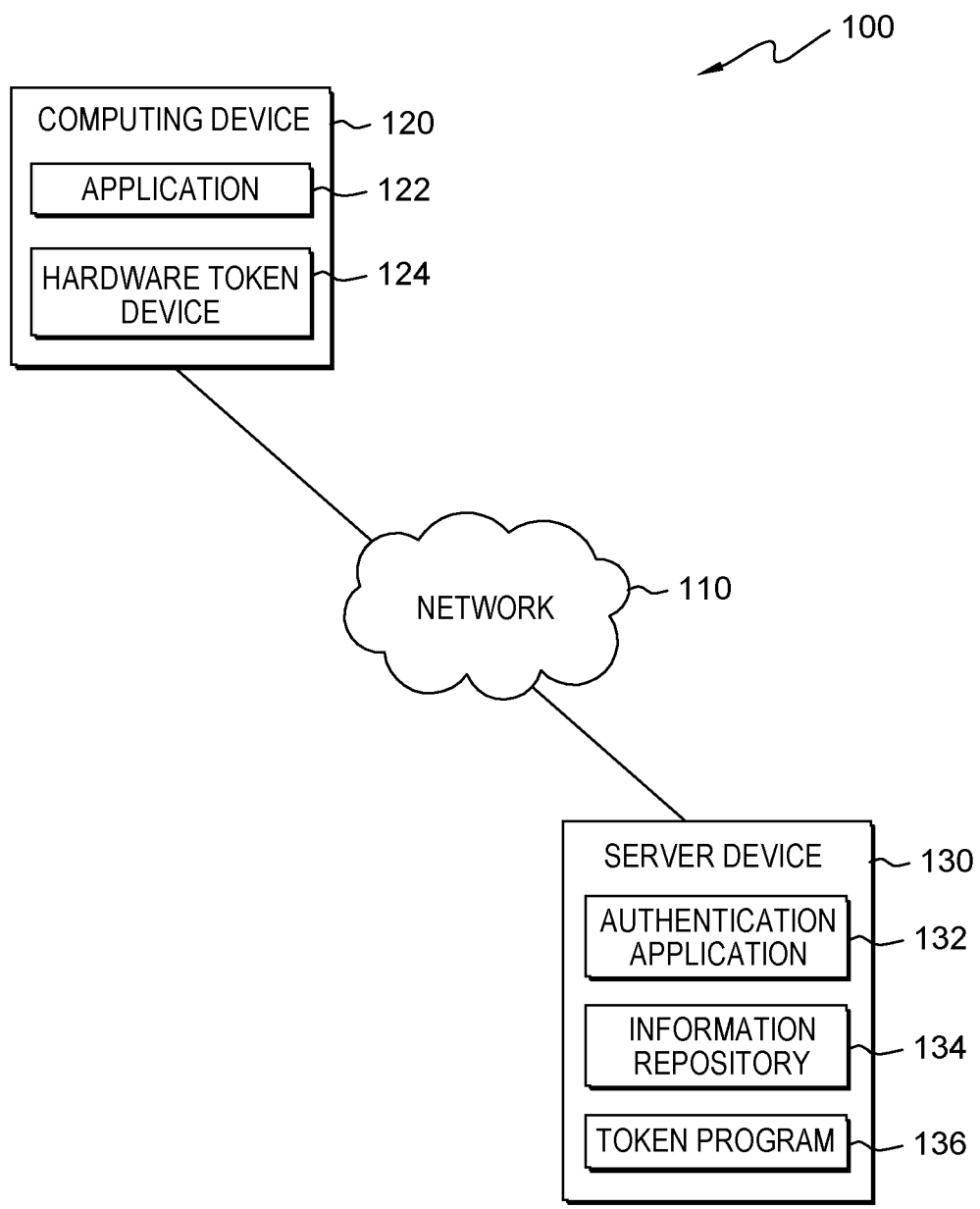
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes computing device 120 and server device 130, connected to network 110. In example embodiments, computing environment 100 includes other computing devices (not shown in FIG. 1) such as smartwatches, cell phones, smartphones, wearable technology, phablets, tablet computers, laptop computers, desktop computers, other computer servers or any other computer system known in the art, interconnected with computing device 120 and server device 130 over network 110.

In embodiments of the present invention, computing device 120 and server device 130 connects to network 110, which enables computing device 120 and server device 130 to access other computing devices and/or data not directly stored on computing device 120 and server device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between computing device 120 and server device 130, and any other computing devices connected to network 110, in accordance with embodiments of the present invention. In an embodiment, data received by another computing device (not shown in FIG. 1) in computing environment 100 is communicated to computing device 120 and server device 130 via network 110.

In embodiments of the present invention, computing device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, computing device 120 represents a computer system utilizing clustered computers and components (e.g., database server computers, application server computers, etc.) that act as a single pool of seamless resources when accessed by elements of computing environment 100. In general, computing device 120 is representative of any electronic device or combination of electronic devices capable of executing computer readable program instructions. In an embodiment, computing environment 100 includes any number of computing device 120. Computing device 120 includes components as depicted and described in further detail with respect to FIG. 4, in accordance with embodiments of the present invention.

According to an embodiment of the present invention, computing device 120 includes application 122 and hardware token device 124. In an embodiment, application 122 is mobile application software that provides an interface between a user of computing device 120 and network 110. Mobile application software, or an "app," is a computer program designed to run on smartphones, phablets, tablet computers and other mobile devices. In another embodiment, application 122 is any application that communicates with a remote computing device via network 110. Examples of application 122 include e-mail applications, calendar applications, banking applications, patient portals, instant messaging (IM) applications, short message service (SMS) text applications, multimedia messaging service (MMS) text applications, team room applications, and the like.

In embodiments of the present invention, hardware token device 124 is a device that generates a single use token (such as a one-time password or OTP) to be used as part of an authentication process for granting access. In an embodiment, hardware token device 124 is disconnected (i.e., does not have either a physical or a logical connection to a computing device) requiring a user to enter the OTP for access. In another embodiment, hardware token device 124 is physically or wirelessly connected to a computing device such as computing device 120. When physically or wirelessly connected, the OTP is electronically available to computing device 120 so that user intervention is not required. A universal serial bus (USB) token is one example of hardware token device 124. In an embodiment, the USB token provides the OTP to a computing device via a USB port or via a wireless protocol, such as near field communication (NFC).

In embodiments of the present invention, server device 130 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, server device 130 represents a computer system utilizing clustered computers and components (e.g., database server computers, application server computers, etc.) that act as a single pool of seamless resources when accessed by elements of computing environment 100. In general, server device 130 is representative of any electronic device or combination of electronic devices capable of executing computer readable program instructions. In an embodiment, computing environment 100 includes any number of server device 130. Server device 130 includes components as depicted and described in further detail with respect to FIG. 4, in accordance with embodiments of the present invention.

In an embodiment, server device 130 includes authentication application 132, information repository 134, and token program 136. In an embodiment, authentication application 132 provides authentication (i.e., verification) of users for websites. One function provided by authentication application 132 includes verifying the username and password combination of a user which are required by a website in order to grant access to the website for the user.

According to embodiments of the present invention, information repository 134 may be storage that is written to and/or read by token program 136. In one embodiment, information repository 134 resides on server device 130. In other embodiments, information repository 134 resides on computing device 120 or on any other device (not shown in FIG. 1) in computing environment 100, in cloud storage or on another computing device accessible via network 110. In yet another embodiment, information repository 134 represents multiple storage devices within server device 130. Examples of data stored to information repository 134 include usernames, passwords, key identification (KeyID), OTPs, and associated websites.

In an embodiment, information repository 134 is implemented using any volatile or non-volatile storage media for storing information, as known in the art. For example, information repository 134 is implemented with a tape library, optical library, one or more independent hard disk drives, multiple hard disk drives in a redundant array of independent disks (RAID), solid-state drives (SSD), or random-access memory (RAM). Similarly, information repository 134 is implemented with any suitable storage architecture known in the art, such as a relational database, an object-oriented database, or one or more tables. In an embodiment of the present invention, application 122, authentication application 132, token program 136, and any other programs and applications (not shown in FIG. 1) operating on computing device 120 and/or server device 130 stores, reads, modifies, or writes data to information repository 134.

According to embodiments of the present invention, token program 136 may be a program, a subprogram of a larger program, an application, a plurality of applications, or mobile application software, which functions to provide second factor authorization using a hardware token device. A program is a sequence of instructions written by a programmer to perform a specific task. In an embodiment, token program 136 runs by itself. In other embodiments, token program 136 depends on system software (not shown in FIG. 1) to execute. In one embodiment, token program 136 functions as a stand-alone program residing on server device 130. In another embodiment, token program 136 works in conjunction with other programs, applications, etc., found in computing environment 100. In yet another embodiment, token program 136 is found on other computing devices (not shown in FIG. 1) in computing environment 100, which are interconnected to server device 130 via network 110.

In an embodiment, token program 136 receives credentials from a user. In an embodiment, token program 136 attempts to verify the credentials of the user. In an embodiment, token program 136 determines whether the credentials of the user were verified. In an embodiment, token program 136 attempts to validate a one-time password (OTP). In an embodiment, token program 136 determines whether the OTP was validated. In an embodiment, token program 136 links the user to a KeyID. In an embodiment, token program 136 generates an access token/refresh token pair. In an embodiment, token program 136 sends the pair.

Figure 2:
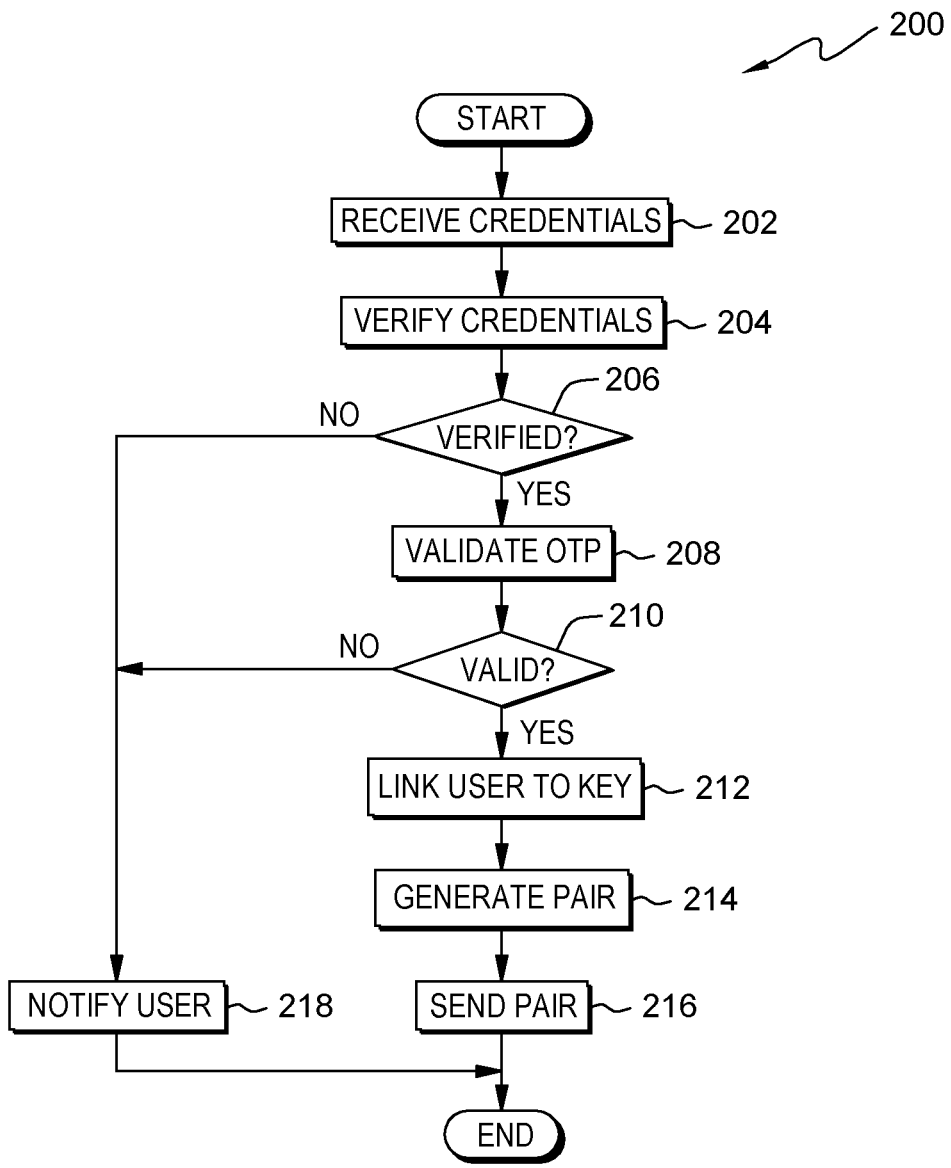
FIG. 2 depicts a flowchart of a program for providing second factor authorization using a hardware token device during a registration process, in accordance with an embodiment of the present invention.

FIG. 2 is a flowchart of workflow 200 depicting a method for provide second factor authorization using a hardware token device during a registration process. In one embodiment, the method of workflow 200 is performed by token program 136. In an alternative embodiment, the method of workflow 200 is performed by any other program working with token program 136. In an embodiment, a user, via a user interface (not shown in FIG. 1), invokes workflow 200 upon opening an application such as application 122. In an alternative embodiment, a user invokes workflow 200 upon accessing token program 136.

In an embodiment, token program 136 receives credentials (step 202). In other words, in response to a user accessing (i.e., signing into) a website, token program 136 receives the credentials from the user that are required by the website for access. In an embodiment, the credentials received by token program 136 are a username and a password provided by a person. In another embodiment, the credentials received by token program 136 are an access token and a refresh token provided by a client application running as a user. In other embodiments, the credentials received by token program 136 include an application program interface (API) key, a client identification (ID), a client username, and an authorization code. In the embodiments, a KeyID and a one-time password (OTP) are also provided. In the embodiments, the KeyID and OTP are provided by a hardware token device. In an embodiment, the KeyID and OTP are a single string of characters. For example, in a string such as "ccccccccegirlluccjclvnnkldjkjuvrcbfrkgdbhgdlj", the first thirteen characters represent the KeyID while the balance of the string represents the OTP. The same thirteen characters are provide by the hardware token device each time the hardware token device sends a password as the thirteen characters identify the specific hardware token device. In another embodiment, the KeyID and OTP are two separate strings of characters (e.g., "ccccccceegirll" is the KeyID and "uccjclvnnkldjkjuvrcbfrkgdbhgdlj" is the OTP). In an embodiment, a user of computing device 120 provides a username and password to access application 122 on computing device 120 and the username and password are received by token program 136 on server device 130. In the embodiment, hardware token device 124 on computing device 120 provides a KeyID and OTP to server device 130 and the KeyID and OTP are received by token program 136. For example, a user of a smartphone sends the credentials of the user as a first step in accessing a specific website. In the example, the username of the user is "SuperUser", the password of the user is "abc123xyz", and the KeyID/OTP are combined as "ccccccceegirlluccjclvnnkldjkjuvrcbfrkgdbhgdlj".

In an embodiment, token program 136 verifies credentials (step 204). In other words, token program 136 verifies that the received credentials (username/password pair) are legitimate. In an embodiment, the verification is completed by comparing the received credentials with credentials stored to a database which in turn is stored to an information repository. In another embodiment, the verification is completed by a program, such as authentication application 132. In yet another embodiment, the verification is completed cryptographically via a digital signature authenticated by a certification authority. In an embodiment, token program 136 compares the received credentials to a database of credentials stored to information repository 134 on server device 130. For example, the username of "SuperUser" and the password of "abc123xyz" provided by the user in order to access the specific website are verified against a database of credentials for that website.

In an embodiment, token program 136 determines whether the credentials were verified (decision step 206). In other words, token program 136 determines whether the received credentials match stored credentials for the user. In one embodiment (decision step 206, YES branch), token program 136 determines that the credentials do match so that the credentials are verified; therefore, token program 136 proceeds to step 208 to validate the OTP. In the embodiment (decision step 206, NO branch), token program 136 determines that the credentials do not match so that the credentials are not verified; therefore, token program 136 proceeds to step 218 to notify the user.

In an embodiment, token program 136 validates the one-time password (step 208). In other words, in some embodiments, responsive to verifying the credentials, token program 136 validates the OTP, received from the hardware token device, for the KeyID. In an embodiment, the validation of the received OTP is done locally (i.e., on the server device) by comparing the received OTP to a OTP for the KeyID stored to a local information repository. In another embodiment, the validation of the received OTP is done remotely on a OTP server (not shown in FIG. 1) by comparing the received OTP to a OTP for the KeyID stored on the OTP server. In an embodiment, token program 136 compares the received OTP, received from hardware token device 124 on computing device 120, to a OTP for hardware token device 124 stored to information repository 134 on server device 130. For example, the received OTP "uccjclvnnkldjkjuvrcbfrkgdbhgdlj" is compared to a OTP stored to a database or some other memory.

In an embodiment, token program 136 determines whether the one-time password was validated (decision step 210). In other words, token program 136 determines whether the received OTP password, received from the hardware token device, matches the OTP for that hardware token device. In one embodiment (decision step 210, YES branch), token program 136 determines that the OTP received from the hardware token device matches the OTP for the specific KeyID so that the received OTP is validated; therefore, token program 136 proceeds to step 212 to link the username to the specific KeyID. In the embodiment (decision step 210, NO branch), token program 136 determines that the OTP received from the hardware token device does not match the OTP for the specific KeyID so that the received OTP is not validated (i.e., the OTP is invalid); therefore, token program 136 proceeds to step 218 to notify the user.

In an embodiment, token program 136 links the user to the KeyID (step 212). In other words, in some embodiments, responsive to validating the received OTP, token program 136 links the username to the KeyID of the hardware token device. In an embodiment, the linking of the username and the KeyID improves the refresh process after an access token expires. In an embodiment, the username and KeyID are linked by storing the combination to a database in an information repository. In an embodiment, token program 136 links the username and KeyID by storing the combination to information repository 134 on server device 130. For example, the username "SuperUser" is linked to the KeyID "ccccccceegirll" and the association of the username and KeyID is stored to a memory.

In an embodiment, token program 136 generates the pair (step 214). In other words, token program 136 generates an access token/refresh token pair. In an embodiment, the access token, provided to a user, allows the user to access a restricted website (i.e., a website that requires specific credentials in order to access). In the embodiment, the refresh token, provided to the user, allows the user to regain access to the restricted website upon expiration of the original access token. In an embodiment, token program 136 on server device 130 generates the access pair/refresh pair token. For example, an access token, represented by "AT0", is generated along with a refresh token, represented by "RT0".

In an embodiment, token program 136 sends the pair (step 216). In other words, token program 136 sends the access token/refresh token pair to the user. In an embodiment, the access token/refresh token pair are received by the user and stored for use as needed. In an embodiment, token program 136 sends the access token/refresh token pair over network 110 to computing device 120, where the access token/refresh token pair are stored to a memory (not shown in FIG. 1). For example, "AT0" and "RT0" are sent to the smartphone of user "SuperUser".

In an embodiment, token program 136 notifies the user (step 218). In other words, in some embodiments, responsive to either the user credentials not being verified or the received OTP not being validated, token program 136 notifies the user of a problem with the user credentials or the received OTP. In an embodiment, the notification is a notice such as an e-mail, a text message, or any other text-based message known in the art, an audible notice such as a beep, ring, buzz, chirp, etc., a haptic notice such as a vibration, a visual notice such as a blinking notification light, or any combination of the previously discussed notices. In an embodiment, token program 136 notifies the user of a problem with the credentials of the user by sending a text message over network 110 to computing device 120. For example, the user "SuperUser" receives a text message that there is a problem with the password provided by "SuperUser". In the example, "SuperUser" typed the password "abc123xya", which was an incorrect password, instead of "abc123xyz", which is the correct password.

Figure 3:
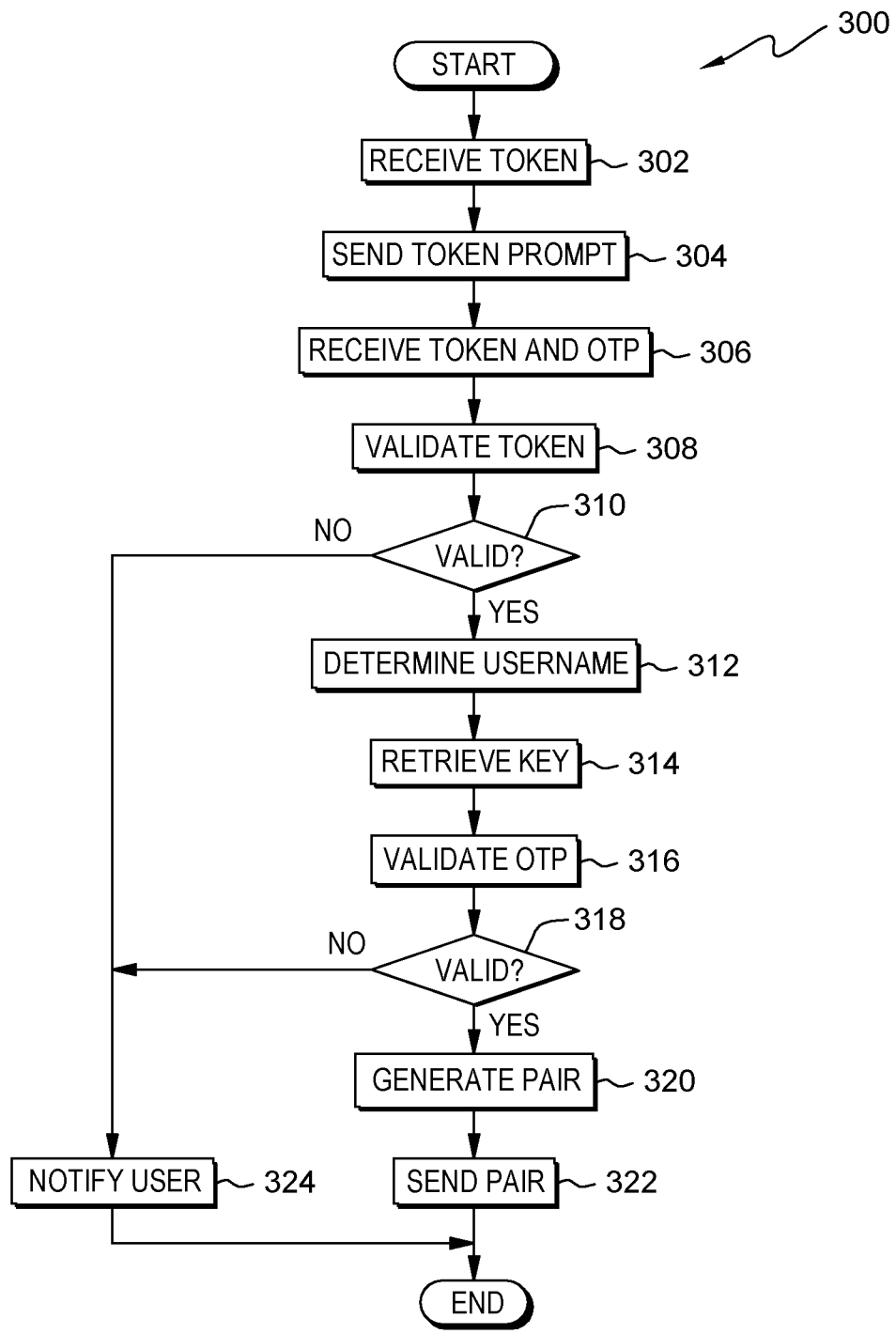
FIG. 3 depicts a flowchart of a program for providing second factor authorization using a hardware token device while accessing a website, in accordance with an embodiment of the present invention.

FIG. 3 is a flowchart of workflow 300 depicting a method for provide second factor authorization using a hardware token device while accessing a website. In one embodiment, the method of workflow 300 is performed by token program 136. In an alternative embodiment, the method of workflow 300 is performed by any other program working with token program 136. In an embodiment, a user, via a user interface (not shown in FIG. 1), invokes workflow 300 upon opening an application such as application 122. In an alternative embodiment, a user invokes workflow 300 upon accessing token program 136.

In an embodiment, token program 136 receives the token (step 302). In other words, upon expiration of the access token currently in use by the user, token program 136 receives the expired access token from the user. In an embodiment, token program 136 receives the expired access token from computing device 120 over network 110. For example, the expired access token "AT0" is received from the user "SuperUser".

In an embodiment, token program 136 sends a token prompt (step 304). In other words, in some embodiments, responsive to receiving the expired access token, token program 136 sends a prompt to the user requesting the previously provided refresh token. In an embodiment, token program 136 requires a correct refresh token, along with a new OTP from the hardware token device, in order to issue a new access token to the user so that the user is able to continue accessing the specific website. In an embodiment, token program 136 sends a prompt, over network 110, to computing device 120, requesting the current refresh token and a new OTP for hardware token device 124. For example, the user "SuperUser" receives a request to send the refresh token "RT0" and a new OTP from the hardware token device being used by the user "SuperUser".

In an embodiment, token program 136 receives token and one-time password (step 306). In other words, token program 136 receives the requested refresh token from the computing device and the new OTP from the hardware token device. In an embodiment, token program 136 receives, over network 110, the refresh token from computing device 120 and a new OTP from hardware token device 124. For example, the refresh token "RT0" is sent from the smartphone of the user "SuperUser" and the new OTP "uccj-clvnnkldjkjuvrcbfrkgdbhgabc" is received from the hardware token device being used by the user "SuperUser".

In an embodiment, token program 136 validates the token (step 308). In other words, token program 136 validates the refresh token received from the user. In an embodiment, the validation is completed by comparing the received refresh token with the refresh token previously sent to the user, which has been stored to a database. In another embodiment, the validation is completed by a program, such as authentication application 132. In yet another embodiment, the validation is completed cryptographically via a digital signature authenticated by a certification authority. In an embodiment, token program 136 compares the received refresh token to the previously sent refresh token stored to information repository 134 on server device 130. For example, the received refresh token "RT0" is compared to the previously sent refresh token (i.e., "RT0") stored to a memory.

In an embodiment, token program 136 determines whether the token was validated (decision step 310). In other words, token program 136 determines whether the refresh token received from the user matches the refresh token previously sent to the user. In one embodiment (decision step 310, YES branch), token program 136 determines that the received refresh token matches the previously sent refresh token stored to a database; therefore, token program 136 proceeds to step 312 to determine the username. In the embodiment (decision step 310, NO branch), token program 136 determines that the received refresh token does not match the previously sent refresh token; therefore, token program 136 proceeds to step 324 to notify the user.

In an embodiment, token program 136 determines the username (step 312). In other words, in some embodiments, responsive to determining that the refresh token is valid, token program 136 determines the username associated with the refresh token. In an embodiment, the username is determined by locating the username associated with the user that received the original, previously sent, refresh token. In another embodiment, the username is determined from the cryptographically packed refresh token. In an embodiment, token program 136 determines the username associated with the original, previously sent, refresh token by locating the username in a database stored to information repository 134 and confirming the associated refresh token. For example, the username "SuperUser" is associated with the refresh token "RT0".

In an embodiment, token program 136 retrieves the key (step 314). In other words, in some embodiments, responsive to determining the username, token program 136 retrieves the KeyID associated with the username. In an embodiment, token program 136 retrieves the KeyID by accessing the database where a link between a username and a KeyID is stored (refer to previous discussion concerning linking a user to a KeyID). In an embodiment, token program 136 accesses information repository 134 to retrieve the KeyID via the link between the username and the KeyID stored to information repository 134. For example, the KeyID of "ccccccceegirll" is retrieved based on the link between the username "SuperUser" and the KeyID of "ccccccceegirll" that is stored to a memory.

In an embodiment, token program 136 validates the one-time password (step 316). In other words, in some embodiments, responsive to retrieving the KeyID, token program 136 validates the new OTP, received from the hardware token device, for the KeyID. In an embodiment, the validation of the new OTP is done locally (i.e., on the server device) by comparing the new OTP to a previous OTP for the KeyID stored to a local information repository and checking to see that the new OTP is the correct format for the KeyID. In another embodiment, the validation of the new OTP is done remotely on a OTP server (not shown in FIG. 1) by comparing the new OTP to a previous OTP for the KeyID stored on the OTP server and checking to see that the new OTP is the correct format for the KeyID. In yet another embodiment, the validation is completed cryptographically via a digital signature authenticated by a certification authority. In an embodiment, token program 136 compares the new OTP received from hardware token device 124 on computing device 120 to a previous OTP for hardware token device 124 stored to information repository 134 on server device 130 and checking to see that the new OTP is the correct format for the KeyID. For example, the new OTP "uccjclvnnkldjkjuvrcbfrkgdbhgabc" is compared to the previous OTP "uccjclvnnkldjkjuvrcbfrkgdbhgdlj" stored to a database or memory and both the new OTP and the previous OTP are in the same format for the KeyID.

In an embodiment, token program 136 determines whether the one-time password was validated (decision step 318). In other words, token program 136 determines whether the new OTP password received from the hardware token device matches the format of the previous OTP for that hardware token device. In one embodiment (decision step 318, YES branch), token program 136 determines that the new OTP received from the hardware token device matches the format of the previous OTP for the specific KeyID so that the new OTP is validated; therefore, token program 136 proceeds to step 320 to generate a new refresh token/access token pair. In the embodiment (decision step 318, NO branch), token program 136 determines that the new OTP received from the hardware token device does not match the format of the previous OTP for the specific KeyID so that the new OTP is not validated (i.e., the new OTP is invalid); therefore, token program 136 proceeds to step 324 to notify the user.

In an embodiment, token program 136 generates the pair (step 320). In other words, token program 136 generates a new access token/refresh token pair. In an embodiment, the new access token, provided to a user, allows the user to continue to access a restricted website (i.e., a website that requires specific credentials in order to access). In the embodiment, the new refresh token, provided to the user, allows the user to regain access to the restricted website upon expiration of the new access token. In an embodiment, token program 136 on server device 130 generates the new access pair/refresh pair token. For example, a new access token, represented by "AT1", is generated along with a new refresh token, represented by "RT1".

In an embodiment, token program 136 sends the pair (step 322). In other words, token program 136 sends the new access token/refresh token pair to the user. In an embodiment, the new access token/refresh token pair are received by the user and stored for use as needed. In an embodiment, token program 136 sends the new access token/refresh token pair over network 110 to computing device 120 where the new access token/refresh token pair are stored to a memory (not shown in FIG. 1). For example, "AT1" and "RT1" are sent to the smartphone of the user "SuperUser".

In an embodiment, token program 136 notifies the user (step 324). In other words, in some embodiments, responsive to either the refresh token not being validated or the OTP not being validated, token program 136 notifies the user of a problem with the refresh token or OTP. In an embodiment, the notification is a notice such as an e-mail, a text message, or any other text-based message known in the art, an audible notice such as a beep, ring, buzz, chirp, etc., a haptic notice such as a vibration, a visual notice such as a blinking notification light, or any combination of the previously discussed notices. In an embodiment, token program 136 notifies the user of a problem with the refresh token of the user by sending a test message over network 110 to computing device 120. For example, the user "SuperUser" receives a text message that there is a problem with the refresh token sent by the user "SuperUser". In the example, the user "SuperUser" sent the refresh token "RT00" instead of the correct refresh token "RT0".

Figure 4:
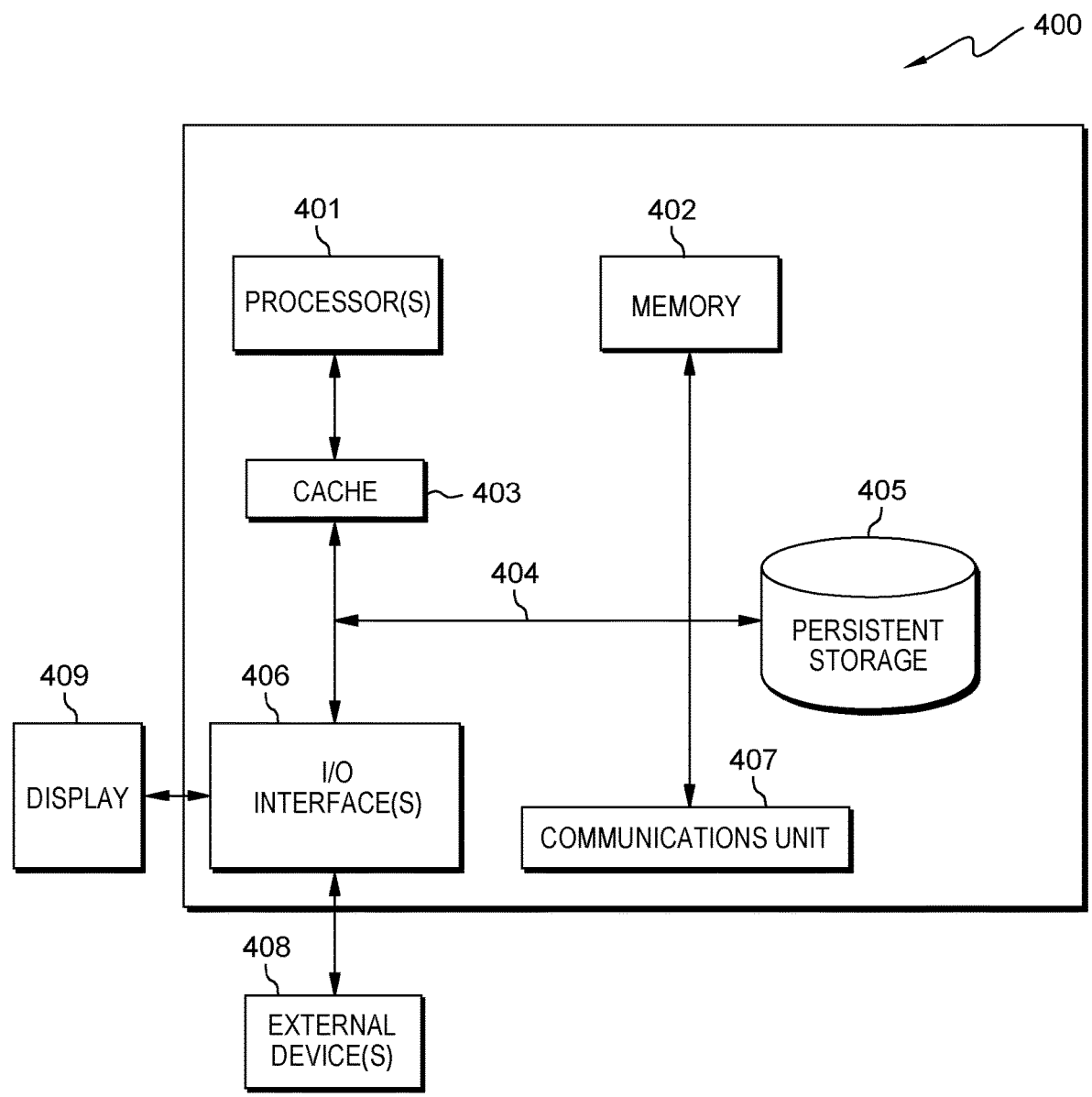
FIG. 4 depicts a block diagram of components of the computing environment of FIG. 1, in accordance with an embodiment of the present invention.

FIG. 4 depicts computer system 400, which is an example of a system that includes token program 136. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for providing second factor authorization using a hardware token device, the method comprising:
   receiving, by one or more computer processors, a credential from a user device, wherein the credential is an application programming interface key;
   providing, by one or more computer processors, based on a hardware token device generated one-time password and a key identification associated with the hardware token device, a continuous secure access to a website associated with the received credential, wherein providing the continuous secure access to the website comprises:
      linking, by the one or more computer processors, a username associated with the credential to the key identification;
      generating, by the one or more computer processors, a first access token and a first refresh token; and
      allowing, by the one or more computer processors, secure access to the website via the key identification associated with the hardware token device and the first access token and the first refresh token;
   responsive to after the first access token expiring, receiving, by the one or more computer processors, the first access token from the user device;
   sending, by the one or more computer processors, a request to the user device to send the first refresh token;
   receiving, by the one or more computer processors, the first refresh token and a second one-time password, wherein the second one-time password is sent from the hardware token device;
   validating, by the one or more computer processors, the first refresh token;
   determining, by the one or more computer processors, the username associated with the first refresh token;
   retrieving, by the one or more computer processors, the key identification from the linked username and key identification;
   validating, by the one or more computer processors, the second one-time password;
   generating, by the one or more computer processors, a second access token and a second refresh token;
   sending, by the one or more computer processors, the second access token and the second refresh token to the user device; and
   maintaining, by one or more computer processors, the continuous secure access to the website via the key identification associated with the hardware token device, the first one-time password, a set of additional one-time passwords, a set of additional access tokens, and a set of additional refresh tokens.

2. The method of claim 1, further comprising:
   determining, by the one or more computer processors, that the second one-time password is invalid; and
   responsive to determining that the second one-time password is invalid, notifying, by the one or more computer processors, the user device.

3. The method of claim 1, further comprising:
   responsive to the first access token expiring, receiving, by the one or more computer processors, the first access token from the user device;
   sending, by the one or more computer processors, a request to the user device to send the first refresh token;
   receiving, by the one or more computer processors, the first refresh token and a second one-time password, wherein the second one-time password is sent from the hardware token device;
   determining, by the one or more computer processors, that the first refresh token is invalid; and
   responsive to determining that the first refresh token is invalid, notifying, by the one or more computer processors, the user device.

4. The method of claim 1, wherein the notification is selected from the group consisting of: a text-based notice, an audible notice, a haptic notice, a visual notice, and any combination of a text-based notice, an audible notice, a haptic notice, and a visual notice.

5. The method of claim 1, wherein:
   a connection of the hardware token device is selected from the group consisting of connected to or not connected to a computing device; and
   the user enters the one-time password into the computing device when the hardware token device is not connected to the computing device.

6. A computer storage medium device for providing second factor authorization using a hardware token device, the computer storage medium device comprising:
   one or more computer readable storage media; and
   program instructions stored on the one or more computer readable storage media, the program instructions comprising:
      the program instructions to receive a credential from a user device, wherein the credential is an application programming interface key;

the program instructions to provide, based on a hardware token device generated one-time password and a key identification associated with the hardware token device, a continuous secure access to a website associated with the received credential, wherein providing the continuous secure access to the website comprises:
the program instructions to link a username associated with the credential to the key identification;
the program instructions to generate a first access token and a first refresh token; and
the program instructions to allow secure access to the website via the key identification associated with the hardware token device and the first access token and the first refresh token;
the program instructions to, responsive to after the first access token expiring, receive the first access token from the user device;
the program instructions to send a request to the user device to send the first refresh token;
the program instructions to receive the first refresh token and a second one-time password, wherein the second one-time password is sent from the hardware token device;
the program instructions to validate the first refresh token;
the program instructions to determine the username associated with the first refresh token;
the program instructions to retrieve the key identification from the linked username and key identification;
the program instructions to validate the second one-time password;
the program instructions to generate a second access token and a second refresh token;
the program instructions to send the second access token and the second refresh token to the user device; and
the program instructions to maintain the continuous secure access to the website via the key identification associated with the hardware token device, the first one-time password, a set of additional one-time passwords, a set of additional access tokens, and a set of additional refresh tokens.

7. The computer storage medium device of claim 6, further comprising the program instructions stored on the one or more computer readable storage media, to:
determine that the second one-time password is invalid; and
responsive to determining that the second one-time password is invalid, notify the user device.

8. The computer storage medium device of claim 6, further comprising the program instructions stored on the one or more computer readable storage media, to:
responsive to the first access token expiring, receive the first access token from the user device, wherein the first access token has expired;
send a request to the user device to send the first refresh token;
receive the first refresh token and a second one-time password, wherein the second one-time password is sent from the hardware token device;
determine that the first refresh token is invalid; and
responsive to determining that the first refresh token is invalid, notify the user device.

9. The computer storage medium device of claim 6, wherein the notification is selected from the group consisting of: a text-based notice, an audible notice, a haptic notice, a visual notice, and any combination of a text-based notice, an audible notice, a haptic notice, and a visual notice.

10. The computer storage medium device of claim 6, wherein:
a connection of the hardware token device is selected from the group consisting of connected to or not connected to a computing device; and
the user enters the one-time password into the computing device when the hardware token device is not connected to the computing device.

11. A computer system for providing second factor authorization using a hardware token device, the computer system comprising:
one or more computer processors;
one or more computer readable storage media; and
program instructions stored on the one or more computer readable storage media for execution by the at least one of the one or more computer processors, the program instructions comprising:
the program instructions to receive a credential from a user device, wherein the credential is an application programming interface key;
the program instructions to provide, based on a hardware token device generated one-time password and a key identification associated with the hardware token device, a continuous secure access to a website associated with the received credential, wherein providing the continuous secure access to the website comprises:
the program instructions to link a username associated with the credential to the key identification;
the program instructions to generate a first access token and a first refresh token; and
the program instructions to allow secure access to the website via the key identification associated with the hardware token device and the first access token and the first refresh token;
the program instructions to, responsive to after the first access token expiring, receive the first access token from the user device;
the program instructions to send a request to the user device to send the first refresh token;
the program instructions to receive the first refresh token and a second one-time password, wherein the second one-time password is sent from the hardware token device;
the program instructions to validate the first refresh token;
the program instructions to determine the username associated with the first refresh token;
the program instructions to retrieve the key identification from the linked username and key identification;
the program instructions to validate the second one-time password;
the program instructions to generate a second access token and a second refresh token;
the program instructions to send the second access token and the second refresh token to the user device; and
the program instructions to maintain the continuous secure access to the website via the key identification associated with the hardware token device, the first one-time password, a set of additional one-time passwords, a set of additional access tokens, and a set of additional refresh tokens.

12. The computer system of claim 11, further comprising the program instructions stored on the one or more computer readable storage media for execution by the at least one of the one or more computer processors, to:

determine that the second one-time password is invalid; and responsive to determining that the second one-time password is invalid, notify the user device.

13. The computer system of claim 11, further comprising the program instructions stored on the one or more computer readable storage media for execution by the at least one of the one or more computer processors, to:

responsive to the first access token expiring, receive the first access token from the user device, wherein the first access token has expired;

send a request to the user device to send the first refresh token;

receive the first refresh token and a second one-time password, wherein the second one-time password is sent from the hardware token device;

determine that the first refresh token is invalid; and responsive to determining that the first refresh token is invalid, notify the user device.

14. The computer system of claim 11, wherein the notification is selected from the group consisting of: a text-based notice, an audible notice, a haptic notice, a visual notice, and any combination of a text-based notice, an audible notice, a haptic notice, and a visual notice.

\* \* \* \* \*